US011322100B2

(12) United States Patent
Chen et al.

(10) Patent No.: US 11,322,100 B2
(45) Date of Patent: May 3, 2022

(54) GRAY SCALE SETTING METHOD, DISPLAY SUBSTRATE AND DISPLAY APPARATUS

(71) Applicants: ORDOS YUANSHENG OPTOELECTRONICS CO., LTD., Inner Mongolia (CN); BOE TECHNOLOGY GROUP CO., LTD., Beijing (CN)

(72) Inventors: Kai Chen, Beijing (CN); Xuelu Wang, Beijing (CN); Ruichao Liu, Beijing (CN); Wei Wei, Beijing (CN); Peimao Li, Beijing (CN)

(73) Assignees: ORDOS YUANSHENG OPTOELECTRONICS CO., LTD., Inner Mongolia (CN); BOE TECHNOLOGY GROUP CO., LTD., Beijing (CN)

( * ) Notice: Subject to any disclaimer, the term of this patent is extended or adjusted under 35 U.S.C. 154(b) by 342 days.

(21) Appl. No.: 16/621,475

(22) PCT Filed: Jul. 19, 2019

(86) PCT No.: PCT/CN2019/096851
§ 371 (c)(1),
(2) Date: Dec. 11, 2019

(87) PCT Pub. No.: WO2020/020076
PCT Pub. Date: Jan. 30, 2020

(65) Prior Publication Data
US 2021/0358432 A1 Nov. 18, 2021

(30) Foreign Application Priority Data
Jul. 25, 2018 (CN) .......................... 201810829442.5

(51) Int. Cl.
*G09G 3/36* (2006.01)
*G02F 1/133* (2006.01)
*G02F 1/1335* (2006.01)

(52) U.S. Cl.
CPC ....... *G09G 3/3607* (2013.01); *G02F 1/13306* (2013.01); *G02F 1/133512* (2013.01);
(Continued)

(58) Field of Classification Search
CPC .... G09G 3/36; G09G 3/3607; G09G 2320/02; G02F 1/13306; G02F 1/133512; G02F 1/133514; G02F 2201/56; G02F 2203/30
See application file for complete search history.

(56) References Cited

U.S. PATENT DOCUMENTS 10,325,545 B2   6/2019  Zheng et al.
10,446,063 B2  10/2019  Yang et al.
(Continued)

FOREIGN PATENT DOCUMENTS

CN   106033656 A   10/2016
CN   107039020 A   8/2017
(Continued)

OTHER PUBLICATIONS

First Office Action dated Oct. 8, 2019 for corresponding Chinese application 201810829442.5.
(Continued)

*Primary Examiner* — Pegeman Karimi
(74) *Attorney, Agent, or Firm* — Nath, Goldberg & Meyer; Joshua B. Goldberg

(57) ABSTRACT

The present disclosure provides a gray scale setting method, a display substrate and a display apparatus, and relates to the field of display technology. The gray scale setting method of the present disclosure applied to a display substrate. The display substrate has a display area and a non-display area. The display substrate includes an edge pixel on a boundary between the display area and the non-display area, and the edge pixel includes a first sub-area pixel within the display area and a second sub-area pixel within the non-display area. The method includes: acquiring an area ratio of the first sub-area relative to the edge pixel; determining a relative transmittance of the edge pixel according to the area ratio of the first sub-area relative to the edge pixel; and determining (Continued)

a display gray scale for the edge pixel according to the determined relative transmittance.

18 Claims, 5 Drawing Sheets

(52) U.S. Cl.
CPC .... *G02F 1/133514* (2013.01); *G02F 2201/56* (2013.01); *G02F 2203/30* (2013.01); *G09G 2320/02* (2013.01)

(56) References Cited

U.S. PATENT DOCUMENTS

| | | | |
|---|---|---|---|
| 2002/0036725 | A1 | 3/2002 | Takasugi et al. |
| 2009/0195481 | A1 | 8/2009 | Taguchi et al. |
| 2016/0267847 | A1 | 9/2016 | Chen et al. |
| 2018/0075797 | A1* | 3/2018 | Park ................ G09G 3/2092 |
| 2018/0130397 | A1* | 5/2018 | Zheng ................ G09G 3/207 |
| 2018/0151612 | A1* | 5/2018 | Zheng ............ H01L 27/14603 |
| 2018/0337217 | A1* | 11/2018 | Zang ................ H01L 51/0096 |
| 2018/0357979 | A1* | 12/2018 | Nakamura ............. G09G 5/10 |
| 2019/0019849 | A1* | 1/2019 | Zheng ............. G02F 1/134309 |

FOREIGN PATENT DOCUMENTS

| | | |
|---|---|---|
| CN | 107422516 A | 12/2017 |
| CN | 107422517 A | 12/2017 |
| CN | 107526201 A | 12/2017 |
| CN | 107608145 A | 1/2018 |
| CN | 107678720 A | 2/2018 |
| CN | 108960169 A | 12/2018 |
| JP | 2002090753 A | 3/2002 |

OTHER PUBLICATIONS

Second Office Action dated Apr. 1, 2020 for corresponding Chinese application 201810829442.5.

* cited by examiner

GRAY SCALE SETTING METHOD, DISPLAY SUBSTRATE AND DISPLAY APPARATUS

CROSS-REFERENCE TO RELATED APPLICATION

This is a National Phase Application filed under 35 U.S.C. 371 as a national stage of PCT/CN2019/096851, filed on Jul. 19, 2019, an application claiming the benefit of priority to Chinese Patent Application No. 201810829442.5 filed on Jul. 25, 2018 in the China National Intellectual Property Administration, the contents of each of which are incorporated herein in their entirety by reference.

TECHNICAL FIELD

The present disclosure relates to the field of display technology, and in particular, to a gray scale setting method, a display substrate, and a display apparatus.

BACKGROUND

With the continuous development of display technology, various display substrates, such as a special-shaped display substrate, have been developed. Compared with the conventional display substrate, the display area of the special-shaped display substrate has a non-rectangular special shape, and the pixels in the display substrate generally have a rectangular or other regular shape. In this case, the boundary between the display area and the non-display area of the special-shaped display substrate cannot completely match the pixel edge. Thus, the edge pixels on the boundary between the display area and the non-display area of the special-shaped display substrate are arranged in a saw-toothed manner during the display.

SUMMARY

In an aspect, the present disclosure provides a gray scale setting method for a display substrate. The display substrate has a display area and a non-display area. The display substrate includes an edge pixel on a boundary between the display area and the non-display area, and the edge pixel includes a first sub-area within the display area and a second sub-area within the non-display area. The method includes: acquiring an area ratio of the first sub-area relative to the edge pixel; determining a relative transmittance of the edge pixel according to the area ratio of the first sub-area relative to the edge pixel; and determining a display gray scale for the edge pixel according to the determined relative transmittance.

In some embodiments, the greater the area ratio of the first sub-area relative to the edge pixel is, the greater the relative transmittance of the edge pixel is.

In some embodiments, the relative transmittance of the edge pixel is an area ratio of the first sub-area relative to the edge pixel.

In some embodiments, determining a display gray scale for the edge pixel according to the determined relative transmittance includes: obtaining a display gray scale corresponding to the determined relative transmittance as the display gray scale for the edge pixel according to a correspondence relationship between the relative transmittance and the display gray scale.

In some embodiments, the method further includes: calculating relative transmittances corresponding to different display gray scales according to a number of display bits and a gamma value of the display substrate, to obtain a correspondence relationship table between the relative transmittance and the display gray scale.

Obtaining the display gray scale corresponding to the determined relative transmittance as the display gray scale for the edge pixel according to the correspondence relationship between the relative transmittance and the display gray scale includes: looking up, from the correspondence relationship table, a display gray scale corresponding to the determined relative transmittance to be used as the display gray scale for the edge pixel.

In some embodiments, the relative transmittance T and the display gray scale G satisfy the following relation:

$$T = \left(\frac{G}{2^N - 1}\right)^\gamma,$$

where N is a number of display bits of the display substrate, and $\gamma$ is a gamma value of the display substrate.

In some embodiments, the method further includes: determining an aperture ratio of the edge pixel according to the display gray scale for the edge pixel. The display gray scale for the edge pixel is positively correlated with the aperture ratio of the edge pixel.

In some embodiments, the display substrate is a color filter substrate. The method further includes: determining a width of a black matrix at the edge pixel according to the display gray scale for the edge pixel. The larger the width of the black matrix at the edge pixel is, the smaller the display gray scale for the edge pixel is.

In some embodiments, the display substrate is an array substrate. The method further includes: determining a width of a light shielding layer at the edge pixel according to the display gray scale for the edge pixel. The larger the width of the light shielding layer at the edge pixel is, the smaller the display gray scale for the edge pixel is.

In some embodiments, the display substrate further includes a pixel electrode, and each edge pixel corresponds to one pixel electrode. The method further includes: determining, according to the display gray scale for the edge pixel, the width of the pixel electrode corresponding to the edge pixel. The display gray scale for the edge pixel is positively correlated with the width of the pixel electrode corresponding to the edge pixel.

In some embodiments, the display area of the display substrate has a non-rectangular shape.

In another aspect, the present disclosure further provides a display substrate having a display area and a non-display area, the display substrate includes an edge pixel on a boundary between the display area and the non-display area, the edge pixel includes a first sub-area within the display area and a second sub-area within the non-display area. An aperture ratio of the edge pixel is set such that a display gray scale of the edge pixel is the display gray scale determined according to the method of the present disclosure.

In some embodiments, the display substrate is a color filter substrate, and a width of a black matrix of the color filter substrate at the edge pixel is set such that the display gray scale of the edge pixel is the determined display gray scale.

In some embodiments, the display substrate is an array substrate, and a width of a light shielding layer of the array substrate at the edge pixel is set such that the display gray scale of the edge pixel is the determined display gray scale.

In some embodiments, the display area of the display substrate has a non-rectangular shape.

In another aspect, the present disclosure further provides a display substrate having a display area and a non-display area. The display substrate includes an edge pixel on a boundary between the display area and the non-display area, and the edge pixel includes a first sub-area within the display area and a second sub-area within the non-display area. The display substrate further includes a pixel electrode, each edge pixel corresponds to one pixel electrode, and a width of the pixel electrode is set such that a display gray scale of the edge pixel is a display gray scale determined according to the method of the present disclosure.

In some embodiments, the display area of the display substrate has a non-rectangular shape.

In another aspect, the present disclosure further provides a display apparatus including a processor, a memory and a computer program stored on the memory and executable on the processor, and the computer program, when executed by the processor, implements steps of the gray scale setting method according to the present disclosure.

DETAILED DESCRIPTION

In order to make the aforementioned objects, features and advantages of the present disclosure more apparent and comprehensible, the present disclosure is described in further detail with reference to the accompanying drawings and the specific embodiments.

At present, two methods can be adopted to improve the saw-toothed edge of the special-shaped display substrate during the display. The first method is to block the edge pixels with a special-shaped black matrix along the boundary of the display area. The second method is to set different gray scales for several edge pixels selected from the edge of the display area, so as to result in a smooth arc effect for the human eye.

However, in the first method, because the blocked areas of the red sub-pixel, the green sub-pixel and the blue sub-pixel in each edge pixel by the special-shaped black matrix are not the same, the edge pixels are prone to display different colors, the display effect is poor, and the saw-toothed edge of the special-shaped display substrate still exist, and the improvement effect is not obvious. In the second method, there is no definite method for determining the number of selected edge pixels and setting the gray scale of each edge pixel, the improvement effect can be determined only during the display, the improvement efficiency is low and there is no uniform rule.

In the present disclosure, description is given by taking the case where the display substrate is a special-shaped display substrate as an example. The special-shaped display substrate refers to a display substrate having a display area in a special shape other than a rectangle, and may include, for example, the special-shaped display substrate shown in FIGS. 1 and 2.

Figure 1:
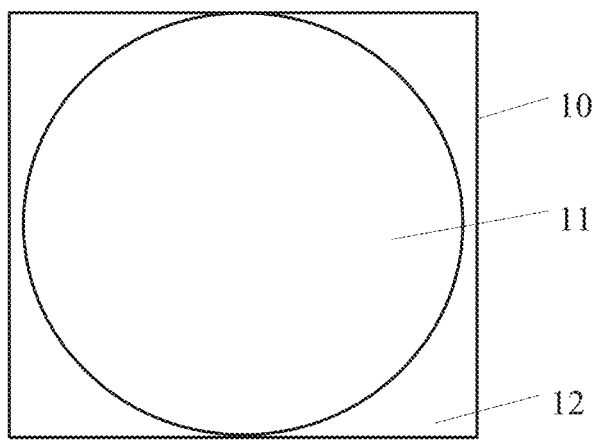
FIG. 1 is a schematic diagram of a structure of a special-shaped display substrate according to an embodiment of the present disclosure.
Figure 2:
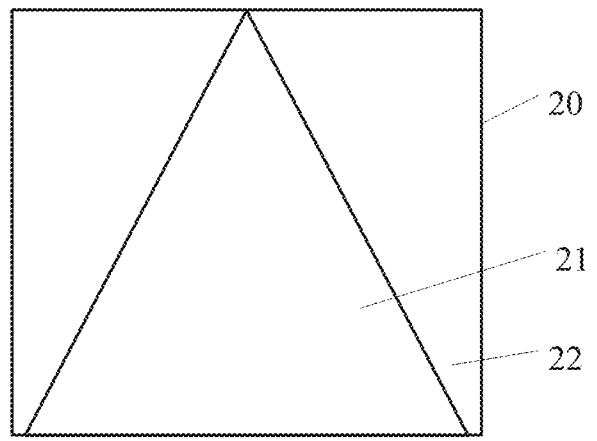
FIG. 2 is a schematic diagram of another structure of a special-shaped display substrate according to an embodiment of the present disclosure.

As shown in FIG. 1, the special-shaped display substrate 10 includes a display area 11 and a non-display area 12, and the display area 11 has a circular shape. As shown in FIG. 2, the special-shaped display substrate 20 includes a display area 21 and a non-display area 22, and the display area 21 has a triangular shape.

It can be understood that the specially-shaped display substrate in the embodiments of the present disclosure includes, but is not limited to, the specially-shaped display substrate shown in FIGS. 1 and 2, and the shape of the display area of the specially-shaped display substrate in the embodiments of the present disclosure may also be a trapezoid, an ellipse, or other shapes. A method for setting a display gray scale of an edge pixel in the embodiments of the present disclosure is described below by taking the special-shaped display substrate 10 shown in FIG. 1 as an example.

Figure 3:
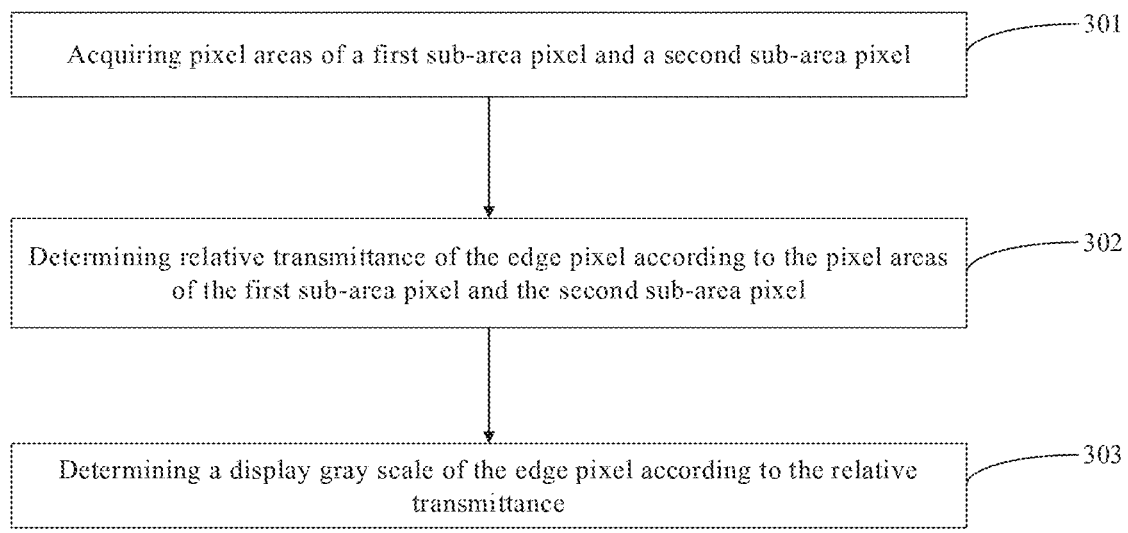
FIG. 3 is a flow chart of a gray scale setting method according to an embodiment of the present disclosure.
Figure 4:
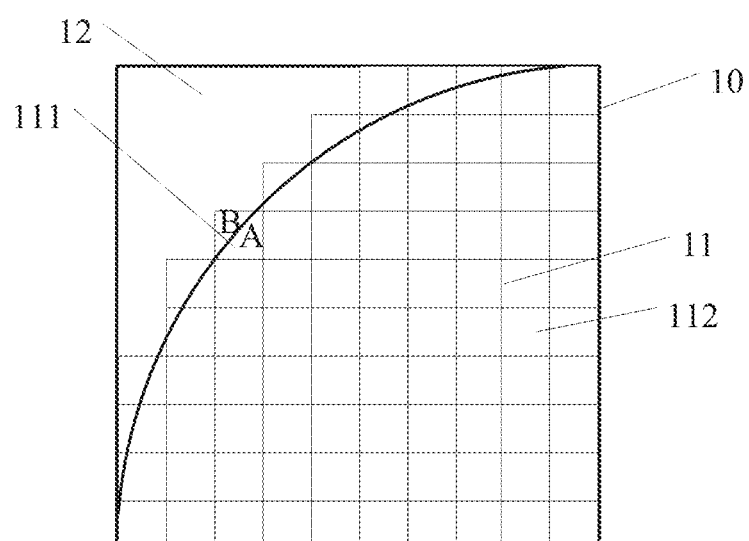
FIG. 4 is a partial schematic diagram of the special-shaped display substrate shown in FIG. 1.
Figure 5:
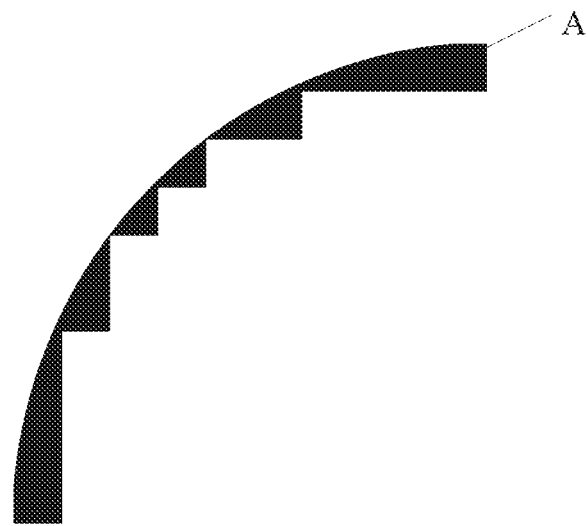
FIG. 5 is a schematic diagram illustrating first sub-area pixels of FIG. 4.
Figure 6:
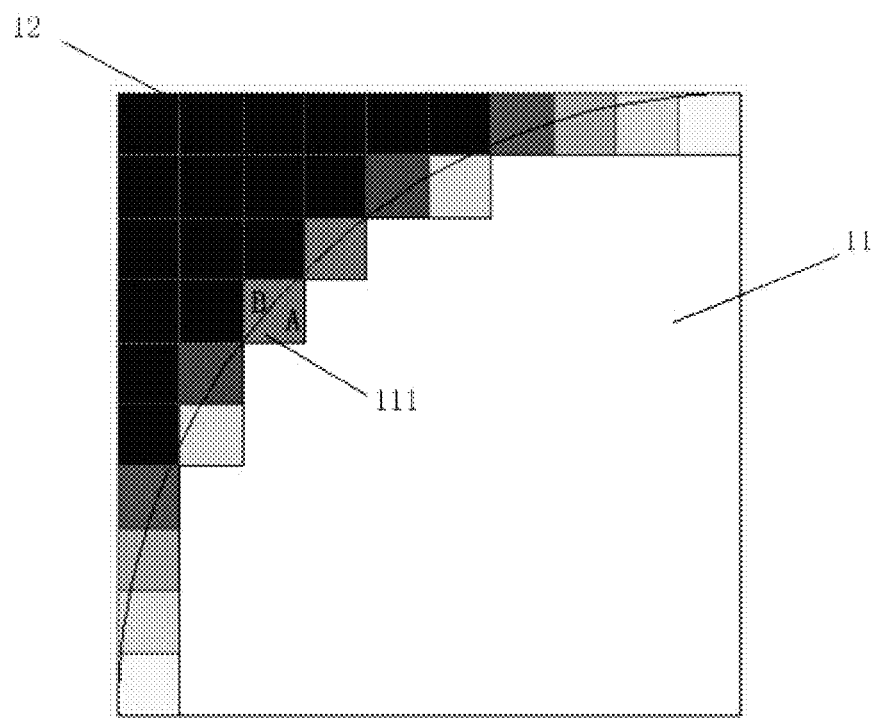
FIG. 6 is a schematic diagram illustrating that edge pixels in FIG. 4 present corresponding display gray scales.

FIG. 3 is a flow chart of a gray scale setting method for a display substrate according to an embodiment of the present disclosure. FIG. 4 is a partial schematic diagram of the special-shaped display substrate shown in FIG. 1. FIG. 5 is a schematic diagram illustrating first sub-area pixels in FIG. 4. FIG. 6 is a schematic diagram illustrating that edge pixels in FIG. 4 present corresponding display gray scales.

As shown in FIG. 4, the special-shaped display substrate 10 has a display area 11 and a non-display area 12, the special-shaped display substrate 10 includes edge pixels 111 located on a boundary between the display area 11 and the non-display area 12, and the edge pixel 111 includes a first sub-area pixel A in the display area 11 and a second sub-area pixel B located in the non-display area 12. As shown in FIG. 5, the first sub-area pixels A of the edge pixels 111 are arranged in a saw-toothed manner.

As shown in FIG. 3, the gray scale setting method for a display substrate according to an embodiment of the present disclosure includes steps 301 to 303.

In step 301, pixel areas of a first sub-area pixel A and a second sub-area pixel B are acquired.

It can be understood that the special-shaped display substrate 10 further includes non-edge pixels 112 entirely within the display area 11 that do not affect the saw-toothed edge of the special-shaped display substrate 10 during the display. Therefore, it is not necessary to particularly set the display gray scales of the non-edge pixels 112, that is, the non-edge pixels 112 normally display in the conventional manner, which is not described in the embodiments of the present disclosure.

It should be noted that the edge pixel 111 and the non-edge pixel 112 in FIG. 4 may each include a red sub-pixel, a green sub-pixel, and a blue sub-pixel.

In the embodiment of the present disclosure, for each edge pixel located on the boundary between the display area and the non-display area, a pixel area $S_A$ of the first sub-area pixel A and a pixel area $S_B$ of the second sub-area pixel B thereof are acquired, respectively.

For example, for each edge pixel 111 of the special-shaped display substrate 10 located on the boundary between the display area 11 and the non-display area 12, the pixel area $S_A$ of the first sub-area pixel A located in the display area 11 and the pixel area $S_B$ of the second sub-area pixel B located in the non-display area 12 are acquired, respectively.

In step 302, relative transmittance of the edge pixel is determined according to the pixel areas of the first sub-area pixel and the second sub-area pixel.

In the embodiment of the present disclosure, the relative transmittance T of the edge pixel is determined according to the pixel area $S_A$ of the first sub-area pixel A and the pixel area $S_B$ of the second sub-area pixel B.

In the embodiment of the present disclosure, the relative transmittance T of the edge pixel is positively correlated with the pixel area $S_A$ of the first sub-area pixel A and negatively correlated with the pixel area $S_B$ of the second sub-area pixel B.

When the pixel area $S_A$ of the first sub-area pixel A is larger, that is, the pixel area $S_B$ of the second sub-area pixel B is smaller, the relative transmittance T of the edge pixel is larger; when the pixel area $S_A$ of the first sub-area pixel A is smaller, that is, the pixel area $S_B$ of the second sub-area pixel B is larger, the relative transmittance T of the edge pixel is smaller.

For example, for each edge pixel 111 of the special-shaped display substrate 10 on the boundary between the display area 11 and the non-display area 12, the relative transmittance T of the edge pixel 111 is determined according to the pixel area $S_A$ of the first sub-area pixel A and the pixel area $S_B$ of the second sub-area pixel B.

In step 303, a display gray scale of the edge pixel is determined according to the relative transmittance.

In the embodiment of the present disclosure, the display gray scale G of the edge pixel is determined according to the determined relative transmittance T of the edge pixel.

In the embodiment of the present disclosure, the relative transmittance T of the edge pixel is positively correlated with the display gray scale G of the edge pixel.

When the relative transmittance T of the edge pixel is larger, the display gray scale G of the edge pixel is larger; when the relative transmittance T of the edge pixel is smaller, the display gray scale G of the edge pixel is smaller.

The edge pixel 111 is set according to the determined display gray scale G of the edge pixel 111, so that a contour of the edge of the display area is smoother, and the saw-toothed edge of the special-shaped display substrate are effectively alleviated.

As shown in FIG. 6, when the pixel area $S_A$ of the first sub-area pixel A in the edge pixel 111 is larger, the corresponding display gray scale G is larger; when the pixel area $S_A$ of the first sub-area pixel A in the edge pixel 111 is smaller, the corresponding display gray scale G is smaller.

It should be noted that the shapes of the edge pixels and the non-edge pixels in the embodiments of the present disclosure are not limited to a rectangle, and apparently, other shapes, such as a hexagon, a diamond, and the like, may also be adopted.

In the embodiment of the present disclosure, the boundary between the display area and the non-display area divides the edge pixel into a first sub-area pixel located in the display area and a second sub-area pixel located in the non-display area, the pixel areas of the first sub-area pixel and the second sub-area pixel are acquired, and the relative transmittance of the edge pixel is determined according to the pixel areas of the first sub-area pixel and the second sub-area pixel, and the display gray scale of the edge pixel is determined according to the relative transmittance. The display gray scale of the edge pixel is accurately calculated according to the pixel areas of the first sub-area pixel and the second sub-area pixel, so that the transition step at the edge pixels is reduced, the contour of the edge of the display area is smoother, and the saw-toothed edge of the special-shaped display substrate is effectively alleviated; meanwhile, since the display gray scale is set for each edge pixel, and the area ratios of the red sub-pixel, the green sub-pixel and the blue sub-pixel in the edge pixel are not influenced, the edge pixel will not display a different color, the display effect of the edge pixel is not influenced, and the gray scale setting efficiency of the edge pixel is remarkably improved.

Figure 7:
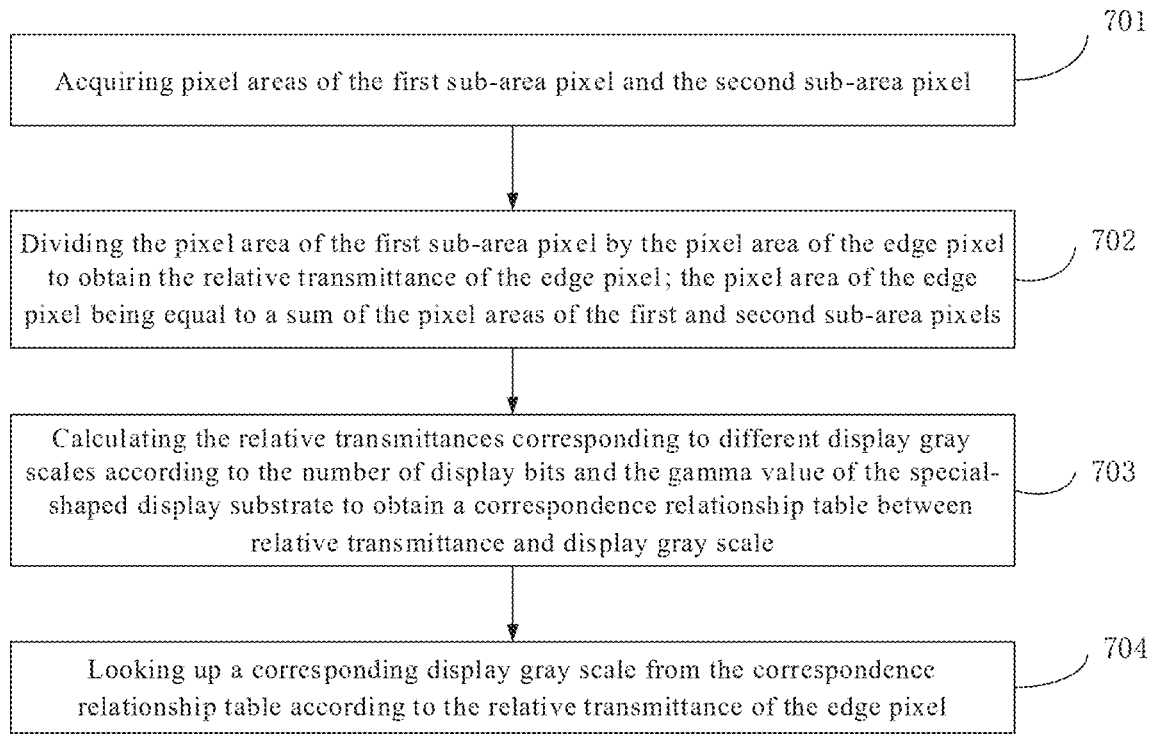
FIG. 7 is a flow chart of a gray scale setting method according to an embodiment of the present disclosure.

FIG. 7 is a flow chart of a gray scale setting method according to an embodiment of the present disclosure. As shown in FIG. 7, the method may include steps 701 to 704.

In step 701, pixel areas of the first sub-area pixel and the second sub-area pixel are acquired.

This step is similar to step 301 in the above embodiment, and is not described here again.

In step 702, the pixel area of the first sub-area pixel is divided by the pixel area of the edge pixel to obtain the relative transmittance of the edge pixel; the pixel area of the edge pixel is equal to a sum of the pixel area of the first sub-area pixel and the pixel area of the second sub-area pixel.

In the embodiment of the present disclosure, for each edge pixel located on the boundary between the display area and the non-display area, the pixel area $S_A$ of the first sub-area pixel A is divided by the pixel area S of the edge pixel to obtain the relative transmittance T of the edge pixel, where the pixel area S of the edge pixel is equal to the sum of the pixel area $S_A$ of the first sub-area pixel A and the pixel area $S_B$ of the second sub-area pixel B, that is, the pixel area S of the edge pixel satisfies: $S=S_A+S_B$.

That is, the relative transmittance T of the edge pixel satisfies: $T=S_A/S=S_A/(S_A+S_B)$.

In step 703, the relative transmittances corresponding to different display gray scales are calculated according to the number of display bits and the gamma value of the special-shaped display substrate to obtain a correspondence relationship table between relative transmittances and display gray scales.

In the embodiment of the present disclosure, the relative transmittances corresponding to different display gray scales are respectively calculated according to the number of display bits and the gamma value of the special-shaped display substrate, so as to obtain a relative transmittance table, as shown in TABLE 1 below:

TABLE 1

| Display gray scale | Relative transmittance |
| --- | --- |
| G1 | T1 |
| G2 | T2 |
| G3 | T3 |

In the present disclosure, the number n of display bits of the special-shaped display substrate and the number GS of gray scales of the special-shaped display substrate satisfy: $GS=2^n$. When the number of display bits is larger, the number of gray scales of the special-shaped display substrate is larger. For example, when the number of display bits is 8, the corresponding number of gray scales is 256, and when the number of display bits is 6, the corresponding number of gray scales is 64.

The gamma value of the special-shaped display substrate represents the relation between the gray-scale value input to the special-shaped display substrate and the brightness of the special-shaped display substrate during display. The gamma value of a typical special-shaped display substrate may be 2.2, or may be other value, such as 2.4.

In the embodiment of the present disclosure, for any target display gray scale, the target display gray scale is divided by a set value to obtain a target ratio; the set value is the difference between 2 to the power of the number of display bits and 1; and the target ratio to the power of the gamma value is determined as the relative transmittance corresponding to the target display gray scale.

In the embodiment of the present disclosure, for any target display gray scale Gm, the target display gray scale Gm is divided by a set value P to obtain a target ratio F, where the set value P is a difference between 2 to the power of the number of display bits and 1; then, the target ratio F to the power of the gamma value is determined as the relative transmittance T corresponding to the target display gray scale Gm.

For example, when the gamma value is 2.2 and the number of display bits is 8, the relative transmittance T corresponding to the target display gray scale Gm satisfies: $T=F^{2.2}=(Gm/P)^{2.2}=(Gm/255)^{2.2}$.

The relative transmittance T and the display gray scale G satisfy the following expression:

$$T = \left(\frac{G}{2^N - 1}\right)^\gamma,$$

where N is the number of display bits of the display substrate, and γ is the gamma value of the display substrate.

Based on the above expression, the relative transmittance T1 corresponding to the display gray scale G1, the relative transmittance T2 corresponding to the display gray scale G2, and the relative transmittance T3 corresponding to the display gray scale G3 are calculated, respectively, so the above TABLE 1 is obtained.

In step 704, a corresponding display gray scale is searched from the correspondence relationship table according to the relative transmittance of the edge pixel.

In the embodiment of the present disclosure, after the relative transmittance T of the edge pixel is calculated, the corresponding display gray scale G is searched from the correspondence relationship table obtained through pre-calculation according to the relative transmittance T of the edge pixel.

For example, when the relative transmittance of the edge pixel is calculated to be T2, the display gray scale G2 corresponding to the relative transmittance T2 is found in TABLE 1.

Apparently, the display gray scale G corresponding to the relative transmittance T may be calculated directly from the relationship between the relative transmittance T and the display gray scale G, after the relative transmittance T of the edge pixel is calculated.

In the embodiment of the present disclosure, after the display gray scale G of the edge pixel is obtained, the aperture ratio of the edge pixel is determined according to the display gray scale G of the edge pixel. The display gray scale of the edge pixel is positively correlated with the aperture ratio of the edge pixel.

Since the aperture ratio of the edge pixel may affect the display gray scale of the edge pixel, the edge pixel can display different display gray scales by setting the aperture ratio of the edge pixel.

The display gray scale of the edge pixel is positively correlated with the aperture ratio of the edge pixel. When the display gray scale of the edge pixel is larger, the corresponding aperture ratio of the edge pixel is larger; when the display gray scale of the edge pixel is smaller, the corresponding aperture ratio of the edge pixel is smaller.

In the case where the special-shaped display substrate is a CF (color filter) substrate, different aperture ratios can be realized by setting the width of a BM (black matrix) on the CF substrate. When the width of the black matrix at the position of the edge pixel is larger, the corresponding aperture ratio is smaller, and when the width of the black matrix at the position of the edge pixel is smaller, the corresponding aperture ratio is larger.

In the case where the special-shaped display substrate is an array substrate, by setting the width of an LS (light shielding layer) on the array substrate, the LS may mainly shield an area between the SD (source and drain electrodes). When the width of the light shielding layer at the position of the edge pixel is larger, the corresponding aperture ratio is smaller, and when the width of the light shielding layer at the position of the edge pixel is smaller, the corresponding aperture ratio is larger.

In the embodiment of the present disclosure, the display substrate further includes pixel electrodes, and each edge pixel corresponds to one pixel electrode. After the display gray scale G of the edge pixel is obtained, the width of a pixel electrode corresponding to the edge pixel is determined according to the display gray scale of the edge pixel; the display gray scale of the edge pixel is positively correlated with the width of the pixel electrode corresponding to the edge pixel.

Because the width of the pixel electrode corresponding to the edge pixel can also influence the display gray scale of the edge pixel, the deflection direction of liquid crystal in a special-shaped display panel manufactured by using the special-shaped display substrate can be changed by setting the width of the pixel electrode corresponding to the edge pixel, so that the edge pixel can display different display gray scales.

The display gray scale of the edge pixel is positively correlated with the width of the pixel electrode corresponding to the edge pixel. When the display gray scale of the edge pixel is larger, the width of the pixel electrode corresponding to the edge pixel is larger; when the display gray scale of the edge pixel is smaller, the width of the pixel electrode corresponding to the edge pixel is smaller.

In the process of manufacturing the special-shaped display substrate in the embodiment of the present disclosure, the width of the black matrix on the CF substrate, the width of the light shielding layer on the array substrate and the width of the pixel electrode are set, so that different display gray scales are displayed by the edge pixels. In the manufacturing process, only one or more of the width of the black matrix, the width of the light shielding layer and the width of the pixel electrode are changed, and an additional manufacturing process is not added.

In the embodiment of the present disclosure, the relative transmittance of the edge pixel is calculated according to the pixel areas of the first sub-area pixel and the second sub-area pixel, and the display gray scale of the edge pixel is determined according to the relative transmittance of the edge pixel. The display gray scale of the edge pixel is accurately calculated according to the pixel areas of the first sub-area pixel and the second sub-area pixel, so that the transition step at the edge pixels is reduced, the contour of the edge of the display area is smoother, and the saw-toothed edge of the special-shaped display substrate is effectively alleviated; meanwhile, since the display gray scale is set for each edge pixel, and the area ratios of the red sub-pixel, the green sub-pixel and the blue sub-pixel in the edge pixel are not influenced, the edge pixel will not display a different color, the display effect of the edge pixel is not influenced, and the gray scale setting efficiency of the edge pixel is remarkably improved.

In another aspect, the present disclosure provides a display substrate having a display area and a non-display area. The display substrate includes edge pixels on a boundary between the display area and the non-display area, and the edge pixels include a first sub-area pixel in the display area and a second sub-area pixel in the non-display area. The aperture ratio of the edge pixel is set such that the display gray scale of the edge pixel is the display gray scale determined according to the gray scale setting method of the present disclosure.

In an embodiment of the present disclosure, the display substrate is a color filter substrate, and the width of the black matrix of the color filter substrate located at the edge pixel is set such that the display gray scale of the edge pixel is the display gray scale determined according to the gray scale setting method of the present disclosure.

When the width of the black matrix at the position of the edge pixel is larger, the corresponding display gray scale is smaller, and when the width of the black matrix at the position of the edge pixel is smaller, the corresponding display gray scale is larger.

In the embodiment of the present disclosure, the display substrate is an array substrate, and a width of a light shielding layer of the array substrate located at the edge pixel is set such that a display gray scale of the edge pixel is a display gray scale determined according to the gray scale setting method of the present disclosure. The light shielding layer mainly shields the area between the source electrode and the drain electrode.

When the width of the light shielding layer at the position of the edge pixel is larger, the corresponding display gray scale is smaller, and when the width of the light shielding layer at the position of the edge pixel is smaller, the corresponding display gray scale is larger.

In another aspect, the present disclosure provides a display substrate having a display area and a non-display area. The display substrate includes edge pixels on a boundary between the display area and the non-display area, and the edge pixels include a first sub-area pixel in the display area and a second sub-area pixel in the non-display area. The display substrate further includes pixel electrodes, each edge pixel corresponds to one pixel electrode, and the width of each pixel electrode is set to enable the display gray scale of the edge pixel to be the display gray scale determined according to the gray scale setting method of the present disclosure.

The display gray scale of the edge pixel is positively correlated with the width of the pixel electrode corresponding to the edge pixel. When the display gray scale of the edge pixel is larger, the width of the pixel electrode corresponding to the edge pixel is larger; when the display gray scale of the edge pixel is smaller, the width of the pixel electrode corresponding to the edge pixel is smaller.

Figure 8:
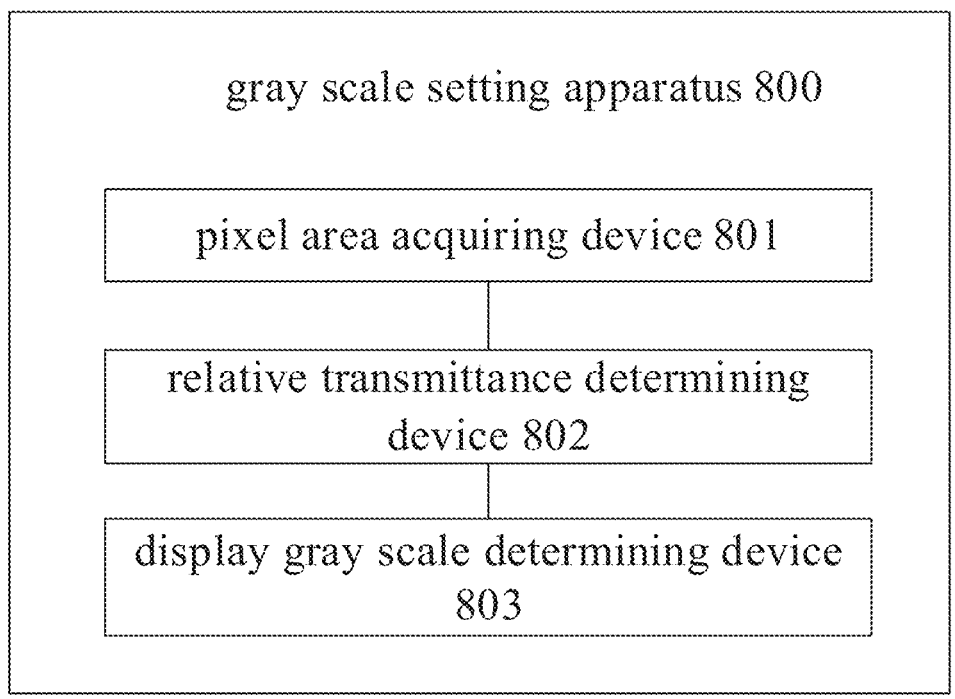
FIG. 8 is a block diagram of a gray scale setting apparatus according to an embodiment of the present disclosure.

FIG. 8 is a block diagram of a gray scale setting apparatus according to an embodiment of the present disclosure.

The gray scale setting apparatus 800 according to the embodiment of the present disclosure is applied to a display substrate having a display area and a non-display area. The display substrate includes edge pixels located on a boundary between the display area and the non-display area, the edge pixels each include a first sub-area pixel located in the display area and a second sub-area pixel located in the non-display area, and the gray scale setting apparatus 800 includes a pixel area acquiring device 801, a relative transmittance determining device 802, and a display gray scale determining device 803.

The pixel area acquiring device 801 is configured to acquire the pixel areas of the first and second sub-area pixels.

The relative transmittance determining device 802 is configured to determine the relative transmittance of the edge pixel according to the pixel areas of the first and second sub-area pixels.

The display gray scale determining device 803 is configured to determine the display gray scale of the edge pixel according to the relative transmittance.

Figure 9:
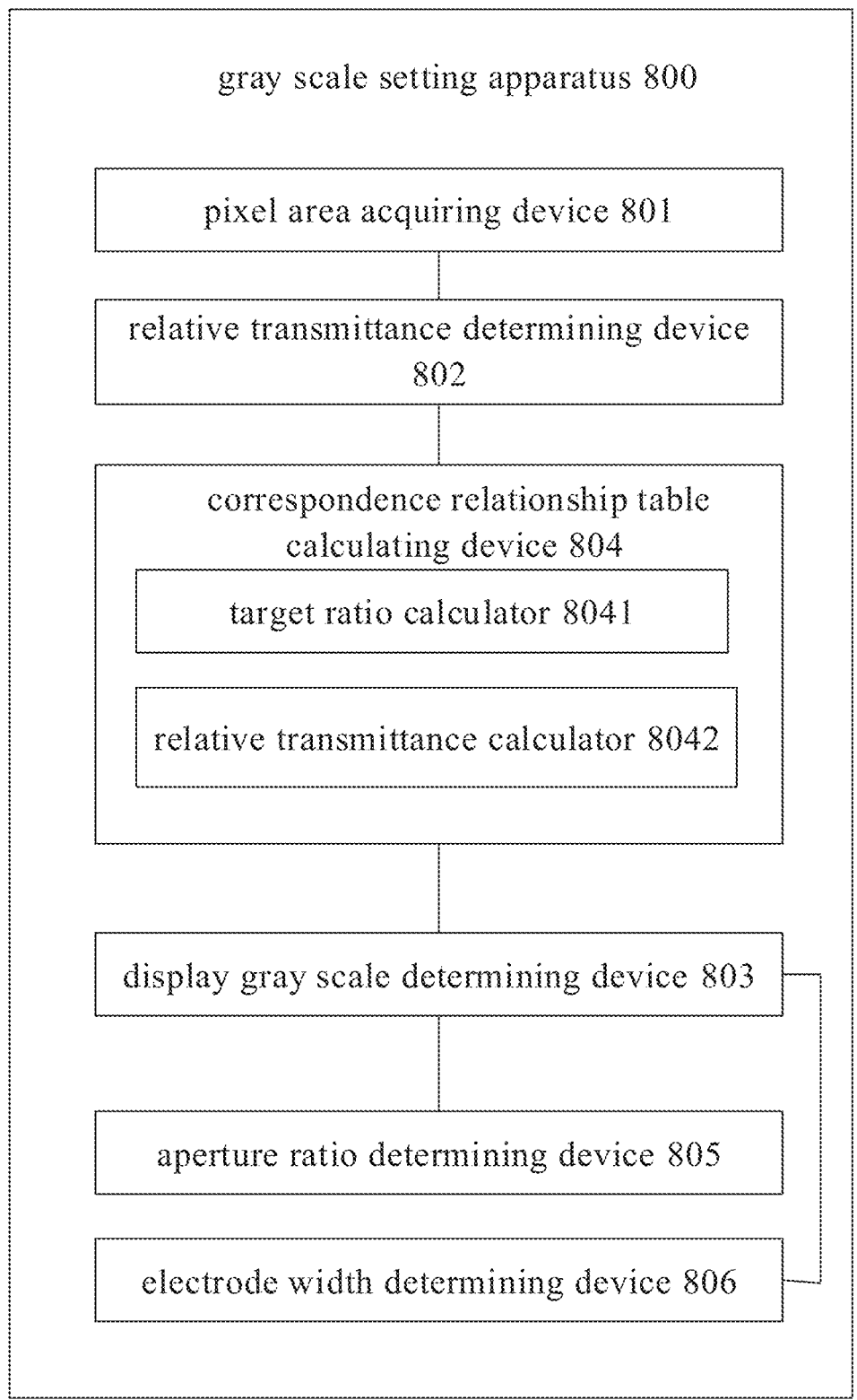
FIG. 9 is a block diagram of a gray scale setting apparatus according to an embodiment of the present disclosure.

FIG. 9 is a block diagram of a gray scale setting apparatus according to an embodiment of the present disclosure.

On the basis of the gray scale setting apparatus described with reference to FIG. 8, the relative transmittance determining device 802 is further configured to divide the pixel area of the first sub-area pixel by the pixel area of the edge pixel to obtain the relative transmittance of the edge pixel; the pixel area of the edge pixel is equal to the sum of the pixel area of the first sub-area pixel and the pixel area of the second sub-area pixel.

In the embodiment of the present disclosure, the gray scale setting apparatus 800 further includes: a correspondence relationship table calculating device 804 configured to calculate relative transmittances corresponding to different display gray scales according to the number of display bits and the gamma value of the special-shaped display substrate to obtain a correspondence relationship table between the relative transmittance and the display gray scale.

The display gray scale determining device 803 is further configured to look up a corresponding display gray scale from the correspondence relationship table according to the relative transmittance of the edge pixel.

In the embodiment of the present disclosure, the correspondence relationship table calculating device 804 includes:

a target ratio calculator 8041 configured to divide a target display gray scale by a set value to obtain a target ratio; the set value is the difference between 2 to the power of the number of display bits and 1; and a relative transmittance calculator 8042 configured to determine the target ratio to the power of the gamma value as the relative transmittance corresponding to the target display gray scale.

In an embodiment of the present disclosure, the gray scale setting apparatus 800 further includes:

an aperture ratio determining device 805 configured to determine an aperture ratio of the edge pixel according to the display gray scale of the edge pixel;

wherein the display gray scale of the edge pixel is positively correlated with the aperture ratio of the edge pixel.

In the embodiment of the present disclosure, the display substrate further includes pixel electrodes, each edge pixel corresponds to one pixel electrode, and the gray scale setting apparatus 800 further includes:

an electrode width determining device 806 configured to determine a width of a pixel electrode corresponding to the edge pixel according to the display gray scale of the edge pixel;

wherein the display gray scale of the edge pixel is positively correlated with the width of the pixel electrode corresponding to the edge pixel.

In the embodiment of the present disclosure, the boundary between the display area and the non-display area divides the edge pixel into a first sub-area pixel located in the display area and a second sub-area pixel located in the non-display area, the pixel areas of the first sub-area pixel and the second sub-area pixel are obtained, the relative transmittance of the edge pixel is determined according to the pixel areas of the first sub-area pixel and the second sub-area pixel, and the display gray scale of the edge pixel is determined according to the relative transmittance. The display gray scale of the edge pixel is accurately calculated according to the pixel areas of the first sub-area pixel and the second sub-area pixel, so that the transition step at the edge pixels is reduced, the contour of the edge of the display area is smoother, and the saw-toothed edge of the special-shaped display substrate is effectively alleviated; meanwhile, since the display gray scale is set for each edge pixel, and the area ratios of the red sub-pixel, the green sub-pixel and the blue sub-pixel in the edge pixel are not influenced, the edge pixel will not display a different color, the display effect of the edge pixel is not influenced, and the gray scale setting efficiency of the edge pixel is remarkably improved.

The embodiments of the present disclosure further provide a display apparatus, which includes a processor, a memory, and a computer program stored in the memory and executable on the processor, and when the computer program is executed by the processor, processes of the gray scale setting method according to the embodiments of the present disclosure are implemented, and the same technical effect can be achieved, and in order to avoid repetition, the details are not repeated here.

While, for purposes of simplicity of explanation, the foregoing method embodiments have been described as a combination of a series of acts, it will be appreciated by those skilled in the art that the present disclosure is not limited by the described order of acts, as some steps may, in accordance with the present disclosure, be performed in other order or simultaneously. Further, those skilled in the art should also appreciate that the embodiments described in the present disclosure are preferred embodiments and that the acts and modules referred to are not necessarily required for the present disclosure.

The embodiments in the present disclosure are described in a progressive manner, each embodiment focuses on differences from other embodiments, and the same and similar parts among the embodiments are referred to each other.

Finally, it should also be noted that, in the present disclosure, relational terms such as first, second, and the like may be used solely to distinguish one entity or operation from another entity or operation without necessarily requiring or implying any actual relationship or order between such entities or operations. Also, the terms "comprise", "include" or any other variation thereof, are intended to cover a non-exclusive inclusion, such that a process, method, article, or apparatus that includes a list of elements includes not only those elements but also other elements not expressly listed or inherent to such process, method, article, or apparatus. Without further limitation, an element defined by the phrase "comprising an . . . " does not exclude the presence of other like elements in a process, method, article, or apparatus that includes the element.

The gray scale setting method and apparatus according to the present disclosure are described in detail above, and the principle and the implementation of the present disclosure are explained herein by applying specific examples, and the description of the above embodiments is only used to help understanding of the method of the present disclosure and the core concept thereof; meanwhile, for a person skilled in the art, there may be variations in the specific embodiments and the application scope based on the concept of the present disclosure, and in summary, the content described herein should not be construed as a limitation to the present disclosure.

The invention claimed is:

1. A gray scale setting method for a display substrate, the display substrate having a display area and a non-display area, the display substrate comprising an edge pixel on a boundary between the display area and the non-display area, the edge pixel comprising a first sub-area within the display area and a second sub-area within the non-display area, the method comprising:

acquiring an area ratio of the first sub-area relative to the edge pixel;

determining a relative transmittance of the edge pixel according to the area ratio of the first sub-area relative to the edge pixel; and determining a display gray scale for the edge pixel according to the determined relative transmittance.

2. The method of claim 1, wherein the greater the area ratio of the first sub-area relative to the edge pixel is, the greater the relative transmittance of the edge pixel is.

3. The method of claim 2, wherein the relative transmittance of the edge pixel is an area ratio of the first sub-area relative to the edge pixel.

4. The method of claim 1, wherein determining a display gray scale for the edge pixel according to the determined relative transmittance comprises:

obtaining a display gray scale corresponding to the determined relative transmittance as the display gray scale for the edge pixel according to a correspondence relationship between the relative transmittance and the display gray scale.

5. The method of claim 4, further comprising: calculating relative transmittances corresponding to different display gray scales according to a number of display bits and a gamma value of the display substrate, to obtain a correspondence relationship table between the relative transmittance and the display gray scale;

wherein obtaining the display gray scale corresponding to the determined relative transmittance as the display gray scale for the edge pixel according to the correspondence relationship between the relative transmittance and the display gray scale comprises:

looking up, from the correspondence relationship table, a display gray scale corresponding to the determined relative transmittance to be used as the display gray scale for the edge pixel.

6. The method of claim 4, wherein the relative transmittance T and the display gray scale G satisfy the following relation:

$$T = \left(\frac{G}{2^N - 1}\right)^\gamma,$$

where N is a number of display bits of the display substrate, and γ is a gamma value of the display substrate.

7. The method of claim 1, further comprising:
   determining an aperture ratio of the edge pixel according to the display gray scale for the edge pixel;
   wherein the display gray scale for the edge pixel is positively correlated with the aperture ratio of the edge pixel.

8. The method of claim 7, wherein the display substrate is a color filter substrate,
   the method further comprises: determining a width of a black matrix at the edge pixel according to the display gray scale for the edge pixel,
   wherein the larger the width of the black matrix at the edge pixel is, the smaller the display gray scale for the edge pixel is.

9. The method of claim 7, wherein the display substrate is an array substrate,
   the method further comprises: determining a width of a light shielding layer at the edge pixel according to the display gray scale for the edge pixel,
   wherein the larger the width of the light shielding layer at the edge pixel is, the smaller the display gray scale for the edge pixel is.

10. The method of claim 1, wherein the display substrate further comprises a pixel electrode, each edge pixel corresponds to one pixel electrode,
    the method further comprises: determining, according to the display gray scale for the edge pixel, the width of the pixel electrode corresponding to the edge pixel;
    wherein the display gray scale for the edge pixel is positively correlated with the width of the pixel electrode corresponding to the edge pixel.

11. The method of claim 1, wherein the display area of the display substrate has a non-rectangular shape.

12. A display substrate having a display area and a non-display area, the display substrate comprising an edge pixel on a boundary between the display area and the non-display area, the edge pixel comprising a first sub-area within the display area and a second sub-area within the non-display area,
    wherein an aperture ratio of the edge pixel is set such that a display gray scale of the edge pixel is the display gray scale determined according to the method of claim 1.

13. The display substrate of claim 12, wherein the display substrate is a color filter substrate, and a width of a black matrix of the color filter substrate at the edge pixel is set such that the display gray scale of the edge pixel is the determined display gray scale.

14. The display substrate of claim 12, wherein the display substrate is an array substrate, and a width of a light shielding layer of the array substrate at the edge pixel is set such that the display gray scale of the edge pixel is the determined display gray scale.

15. The display substrate of claim 12, wherein the display area of the display substrate has a non-rectangular shape.

16. A display substrate having a display area and a non-display area, the display substrate comprising an edge pixel on a boundary between the display area and the non-display area, the edge pixel comprising a first sub-area within the display area and a second sub-area within the non-display area,
    wherein the display substrate further comprises a pixel electrode, each edge pixel corresponds to one pixel electrode, and a width of the pixel electrode is set such that a display gray scale of the edge pixel is a display gray scale determined according to the method of claim 1.

17. The display substrate of claim 16, wherein the display area of the display substrate has a non-rectangular shape.

18. A display apparatus comprising a processor, a memory and a computer program stored on the memory and executable on the processor, the computer program, when executed by the processor, implementing steps of the gray scale setting method of claim 1.

* * * * *